United States Patent [19]

Harpell et al.

[11] Patent Number: 4,883,700

[45] Date of Patent: Nov. 28, 1989

[54] COMPOSITE AND ARTICLE USING SHORT LENGTH FIBERS AT OBLIQUE ANGLES

[75] Inventors: G. A. Harpell, Morris Township, Morris County; H. L. Li, Parsippany; Y. D. Kwon, Mendhem; D. C. Prevorsek, Morris Township, Morris County, all of N.J.

[73] Assignee: Allied-Signal Inc., Morris Township, Morris County, N.J.

[21] Appl. No.: 81,073

[22] Filed: Aug. 3, 1987

[51] Int. Cl.$^4$ .............................................. B32B 5/12
[52] U.S. Cl. ........................................ 428/113; 2/5; 2/6; 2/410; 2/411; 2/412; 428/189; 428/190; 428/224; 428/226; 428/232; 428/246; 428/253; 428/254; 428/284; 428/286; 428/293; 428/294; 428/297; 428/298; 428/302; 428/902; 428/911; 428/112
[58] Field of Search .............. 428/113, 189, 112, 190, 428/105, 107, 253, 224, 226, 232, 246, 254, 284, 286, 293, 294, 297, 298, 302, 902, 911

[56] References Cited

U.S. PATENT DOCUMENTS

| | | | |
|---|---|---|---|
| 3,865,677 | 2/1975 | Marzocchi et al. | 428/112 |
| 4,255,478 | 3/1981 | Crane | 428/112 X |
| 4,309,487 | 1/1982 | Holmes | 428/516 |
| 4,403,012 | 9/1983 | Harpell et al. | 428/290 |
| 4,457,985 | 7/1984 | Harpell et al. | 428/224 |
| 4,501,856 | 2/1985 | Harpell et al. | 525/240 |
| 4,543,286 | 9/1985 | Harpell et al. | 428/288 |
| 4,584,347 | 4/1986 | Harpell et al. | 525/119 |
| 4,606,961 | 8/1986 | Munsen et al. | 428/284 X |
| 4,613,535 | 9/1986 | Harpell et al. | 428/113 |
| 4,622,254 | 11/1986 | Nishimura et al. | 428/289 X |
| 4,623,574 | 11/1986 | Harpell et al. | 428/113 |
| 4,650,710 | 3/1987 | Harpell et al. | 428/263 |
| 4,663,101 | 5/1987 | Kavesh et al. | 264/178 |
| 4,681,792 | 7/1987 | Harpell et al. | 428/284 |
| 4,737,401 | 4/1988 | Harpell et al. | 428/252 |
| 4,737,402 | 4/1988 | Harpell et al. | 428/252 |

OTHER PUBLICATIONS

Sers. No. 808,861; 825,039; 766,727; 081,260; 081,075; 081,074.
John V. E. Hansen and Roy C. Liable, Flexible Body Armor Materials, Fiber Frontiers ACS Conference, Jun. 10-12, 1974.
NTIS Publication ADA018 958, New Materials in Construction for Improved Helmets, A. L. Alesi, et al.
M. R. Lilyquist et al., J. Marcomol Sci. Cheme., A7 (1), 203, et seq., (1973).

(List continued on next page.)

Primary Examiner—Lorraine T. Kendell
Attorney, Agent, or Firm—P. L. Henry; R. A. Neglin; G. H. Fuchs

[57] ABSTRACT

The present invention is an improved prepreg layer, multilayer composition based on the improved prepreg layer, and article made from the multilayer composite.

The prepreg layer of the present invention comprises an array of at least one adjacent, coplanar fibrous element. Each element has a longitudinal axis and each element comprises a plurality of unidirectional coplanar fibers embedded in a polymeric matrix. The fibers are at an oblique angle to the longitudinal axis of the element. The fibers are up to eight inches, preferably from one to eight inches, and more preferably two to six inches long. The adjacent elements are connected by the polymer matrix. Typically, the elements are in strip or sheet form with the longitudinal axis corresponding to long dimension of the strip or sheet. Alternately, the prepreg layer can be a fabric layer, where the fibers are woven or knit and the fibers are at an oblique angle to the longitudinal axis.

The present invention includes a multilayer composite comprising a plurality of the prepreg layers where each prepreg layer comprises an array of at least one coplanar, and alternately at least two adjacent coplanar fibrous elements.

14 Claims, 3 Drawing Sheets

OTHER PUBLICATIONS

Williams et al., The Impact Strength of Fibre Composites, Journal of Materials Science, vol. 8, pp. 1765–1787, (1973).

Alesi, Aramid Fiber-Reinforced Ionomer, Polymer Engineering and Science, vol. 18, No. 16, pp. 1209–1215, (Dec., 1978).

Silverman, effect of Glass Fibre Length on the Creep and Impact Resistance of Reinforced Thermoplastics, Polymer Composites.

Roylance et al., Ballistic Impact of Textile Structures, Textile Research Journal, pp. 34–41, (Jan., 1973).

Roylance, Influence to Fibre Properties of Ballistic Penetration of Textile Panels, Fibre Science & Technology, vol. 14, pp. 183–190, (1981).

Liable, Ballistic Materials and Penetration Mechanics, Elsevier Scientific Publishing Co., Chap. 4, (1980).

Roy C. Liable et al., J. Macromel, Sci. Chem., A7 (1), pp. 295–322, 1973.

COMPOSITE AND ARTICLE USING SHORT LENGTH FIBERS AT OBLIQUE ANGLES

BACKGROUND OF THE INVENTION

Fiber arrays impregnated with various polymers are well known. Typically, these take the form of short randomly distributed fibers or long continuous fibers either in mat, weave or knit form or in continuous form where adjacent fibers are parallel and generally continuous through the fabric. For the purpose of the present invention one or more fibrous layers made from fiber impregnated with a polymeric matrix and useful to form articles is known as a "prepreg". Forms of prepregs include impregnated woven fabric, felt mats, as well as unidirectional fiber fabric.

The use of high strength and cut resistance fibers have made such prepregs useful to make articles which are resistant to cutting and high speed impact from projectiles such as BB's, bullets, shells, shrapnel, glass fragments, and the like.

Fibers conventionally used include aramid fibers, fibers such as poly(phenylenediamine terephthalamide), graphite fibers, ceramic fibers, nylon fibers, glass fibers and the like. For these applications, the fibers are ordinarily encapsulated or embedded in a rigid matrix material and, in some instances, are joined with rigid facing layers to form complex composite structures.

Ballistic articles such as bulletproof vests, helmets, armor plate, and other military equipment, structural members of helicopters, aircraft, ships, and vehicle panels and briefcases contaning high strength fibers are known.

U.S. Pat. No. 4,403,012 and U.S. Pat. No. 4,457,985 disclose ballistic-resistant composite articles comprised of networks of ultra-high molecular weight polyethylene or polypropylene fibers in matrices composed of olefin polymers and copolymers, unsaturated polyester resins, epoxy resins and other resins curable below the melting point of the fiber.

Particular reference in made to U.S. Pat. No. 4,457,985 at Col. 3, beginning at line 53 where it is disclosed that ballistic resistant articles can contain fibers formed as a felt, basket woven or formed into fabric in any of a variety of conventional techniques. Reference is made to techniques such as those described in U.S. Pat. No. 4,181,768 and M. R. Lilyquist, et al., J. Macromol. Sci. Cheme., A7 (1) 203 et seq (1973).

Reference is made to ballistic resistance composite articles disclosed in U.S. Pat. Nos. 4,457,985; 4,501,856; 4,613,535 4,623,574; and 4,650,710. These patents consistently teach forming prepregs and composite structures in the manner reviewed above with regard to U.S. Pat. No. 4,457,985.

U.S. Pat. No. 4,309,487 discloses ballistic resistant laminates of polyethylene fibers where the fibers in each layer are unidirectionally oriented and at an angle to fibers in adjacent layers. The laminates are made in the absence of adhesives with each layer being at least 0.5 mils thick. A six inch by six inch square film laminate is disclosed in the Examples. Also of interest in U.S. Pat. No. 4,079,161.

The teachings of these patents are consistent with the general teaching of the art that articles made of composites having ballistic resistance should be based upon fiber having continuous length in the article. This is supported by teaching such as Williams, et al., The Impact Strength Of Fibre Composites, Journal Of Materials Science, Vol. 8, p. 1765-1787 (1973); and Silverman, Effect Of Glass Fibre Length On The Creep and Impact Resistance Of Reinforced Thermoplastics, Polymer Composites, Vol. 8, No. 1 pp. 8-15 (February, 1987).

Alesi, Aramid Fiber-Reinforced Ionemer, Polymer Engineering and Science, Vol. 18, No. 16, pp. 1209-1215 (December, 1978) discloses the use of chopped aramid fiber having a length of from one quarter to one-half inch for use in compression and injection molding. Ballistic performance of these composites was very poor.

Roylance, et al., Ballistic Impact Of Textile Structures, Textile Research Journal, pp. 34-41 (January 1973) discloses fiber behavior during ballistic impact. Reference is also made to Roylance, Influence to Fibre Properties on Ballistic Penetration of Textile Panels, Fibre Science and Technology, Vol. 14, pp. 183-190 (1981). There is a review of ballistic penetration resistance of textile panels. These references suggest that fabrics made from continuous fibers would be consistent with their goals of improved ballistic composite properties.

Liable, Ballistic Materials and Penetration Mechanics, Elsevier Scientific Publishing Company (1980), consistent with the other art indicates the desirability of continuous length fiber for use to attain ballistic resistance.

Reference is made to applicants copending application U.S. Ser. No. 081,260, now U.S. Pat. No. 4,820,568 which discloses a prepreg layer comprising an array of at least two adjacent coplanar fibrous elements. Each element is embedded in a polymeric matrix. The fibers are from one to eight inches in length. The adjacent elements are connected by the polymer matrix. There are fibers perpendicular and parallel to the longitudinal axis. This application also discloses composites and articles based on this prepreg layer.

Layers of substantially unidirectional fibers embedded in rubber, with the fibers on a "bias" to the longitudinal axis are known for use in making various articles including tires. Tires are built using multiple layers of this type of fabric with adjacent layers at oblique angles to each other and to the longitudinal axis of the fabric.

SUMMARY OF THE INVENTION

The present invention is an improved prepreg layer, multilayer composite based on the improved prepreg layer, and article made from the multilayer composite.

The prepeg layer of the present invention comprises an array of at least one adjacent, coplanar fibrous element. Each element has a longitudinal axis and each element comprises a plurality of unidirectional coplanar fibers embedded in a polymeric matrix. The fibers are at an oblique angle to the longitudinal axis of the element. The fibers are up to eight inches, preferably from one to eight inches and more preferably from two to six inches long. The adjacent elements are connected by the polymer matrix. Typically, the elements are in strip or sheet form with the longitudinal axis corresponding to long dimension of the strip or sheet. Alternately, the prepreg layer can be a fabric layer, where the fibers are woven or knit and the fibers are at an oblique angle to the longitudinal axis.

The present invention includes a multilayer composite comprising a plurality of the prepreg layers where each prepreg layer comprises an array of at least one coplanar, and alternately at least two adjacent coplanar fibrous elements. Each element has a longitudinal axis and comprises a plurality of unidirectional fibers embedded in a polymeric matrix. The fibers are at an oblique angle to the longitudinal axis. The fibers are up to eight inches, preferably from 1 to 8 inches, and more preferably from 2 to 6 inches long. The fibers of adjacent layers are at an angle of from 45° to 90°, preferably 60° to 90°, more preferably 80° to 90°, and most preferably at an angle of about 90° from each other. The angle of fibers in alternate layers is preferably, substantially the same. The boundaries of the interconnected elements within each prepeg layer are preferably offset from boundaries in alternate layers. The composite preferably has 2 to 500, more preferably 60 to 150 layers, and most preferably 60 to 150 layers.

In an alternate embodiment, the prepreg layers comprises woven or knit fabric having fibers in a direction oblique to the longitudinal axis of the element. The fibers in each element are from up to eight inches long, preferably 1 to 8, and more preferably 2 to 6 inches long.

An article can be made from the multilayer composite of the present invention. The article can be planar, or formed into three dimensions such as helmets and other three dimensional articles. When using the composite in strip form, useful articles are ballistic resistant posts between the windows of an automobile, or as reinforcements for window shades.

The prepreg layer, and multilayer composite made using the prereg layer result in articles that are resistant to high speed impact by bullets, shell fragments and the like. The fibers are therefore preferably made of a relatively high strength material having a tensile modulus of at least about 160 grams/denier and preferably at least 500 grams/denier and the tenacity of at least about 7 grams/denier and preferably at least 22 grams/denier. The matrix can be any polymeric matrix and is preferably an elastomeric matrix. The oblique angle of the fibers results in improved flexibility in the longitudinal axis.

DETAILED DESCRIPTION OF THE INVENTION

Figure 1:
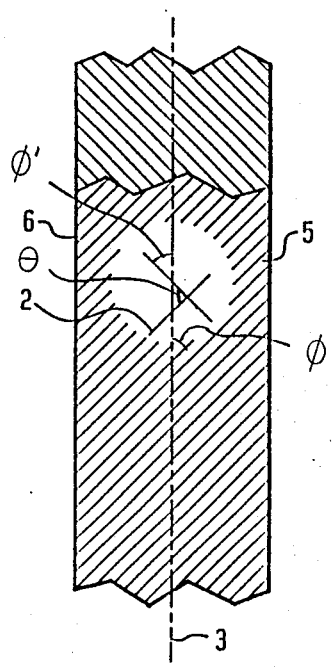
FIG. 1 is a schematic drawing, not to scale, of a composite strip made from two strip elements of the present invention.

The present invention includes a prepreg layer comprising an array of at least one adjacent coplanar, fibrous elements. The elements have a longitudinal axis. By longitudinal axis it is meant the main line of direction through the element. Each element preferably comprises a plurality of unidirectional fibers embedded in a polymer matrix. The fibers in each element are at an oblique angle to the longitudinal axis and are up to eight inches long, preferably from 1 to 8, and more preferably 2 to 6 inches long. The adjacent coplanar elements are connected through a polymer matrix.

The present invention also includes a multilayer composite comprising a plurality of the prepreg layers. Each prepreg layer comprises an array of at least one, and alternately at least two, fibrous element. Each element has a longitudinal axis and comprises a plurality of unidirectional fibers embedded in a polymeric matrix. The fibers are at an oblique angle to the longitudinal axis and are up to eight inches long, preferably from 1 to 8, preferably 2 to 6 and most preferably 2 to 4 inches in length. The fibers of adjacent layers are at an angle of from 45° to 90°, preferably 60° to 90°, more preferably 80° to 90°, and most are preferably at an angle of about 90° from each other. The angle of fibers in alternate layers is preferably substantially the same. The element boundaries of alternate layers are preferably offset from each others. This results in an avoidance of weakness at the boundary points. The multilayer composites contain at least 2 layers, preferably from 2 to 500, and more preferably 10 to 150, and most preferably 60 to 120 prepreg layers. The composite is useful in the form of planar strips and sheets to form three dimensional formed articles.

The composite articles of the present invention have improved impact resistance. The composite articles preferably comprise high strength fibers having a tensile modulus of at least about 160 grams/denier and preferably at least about 500 grams/denier and a tenacity of at least about 7 grams/denier and preferably at least 22 grams/denier in a polymer matrix which is preferably an elastomeric matrix having a tensile modulus of less than about 20,000 psi, (measured at according to ASTM D638-84 at 25° C.).

For the purposes of the present invention, fiber is an elongated body, the length dimension of which is much greater than the transverse dimensions of width and thickness, Accordingly, the term fiber includes monofilament, multifilament fiber, ribbon, strip, a plurality of any one of combinations thereof and the like having regular or irregular cross-section.

Depending on the application for use of the prepreg layer in the multilayer composite of the present invention different fibers and different matrices can be used. Useful fibers include polyolefin based polymers and particularly ultra high molecular weight polyolefin fibers including polethylene and polypropylene fibers. Other useful high strength fibers include aramid fibers, polyvinyl alcohol fibers and other high strength fibers. Also useful in the present invention are a variety of conventional fibers which would result in improvement in resistance to impact properties when used in accordance with the present invention. Such fibers include but are not limited to asbestos, carbon, graphite, boron, cellulose, alumina, and metal fibers.

Fiber useful in the present invention include hightly oriented ultra-high molecular weight polyethylene fiber, highly oriented ultra-high molecular weight polypropylene fiber, aramid fiber, polyvinyl alcohol fiber or combinations thereof. U.S. Pat. No. 4,457,985 generally discusses such oriented ultra high molecular weight polyethylene and polypropylene fibers, and disclosure of which is hereby incorporated by reference to the extent not inconsistent herewith. In the case of polyethylene, suitable fibers are those highly oriented fibers of weight average molecular weight of at least about 200,000 and preferably at least 500,000 preferably at least about one million and more preferably between about two million and about five million. Known as extended chain polyethylene (ECPE) fibers, such fibers may be produced from polyethylene solution spinning processes described for example, in U.S. Pat. No. 4,137,394 to Meihuzen et al. or U.S. Pat. No. 4,356,138 to Kavesh et al., or spun from a solution to form a gel structure as described in German Off. No. 3,044,699, GB No. 2051667, and especially as described in U.S. Pat. No. 4,413,110.

As used herein, the term polyethylene shall mean a predominantly linear polyethylene material that may contain minor amounts of chain branching or comonomers not exceeding 5 modifying units per 100 main chain carbon atoms and that may also contain admixed therewith up to about 25 wt% of one or more polymeric additives such as alkene-1-polymers, in particular low density polyethylene, polypropylene or polybutylene, copolymers containing mono-olefins as primary monomers, oxidized polyolfins, graft polyolefin copolymers and polyoxymethylenes, or low molecular weight additives such as anti-oxidants, lubricants, ultra-violet screening agents, colorants and the like which are commonly incorporated therewith. Depending upon the fiber forming technique, the draw ratio and temperatures, and other conditions, a variety of properties can be imparted to these fibers. The tenacity of the fibers is ordinarily at least about 15 grams/denier, preferably at least about 25 grams/denier and most preferably at least about 30 grams/denier. Similarly, the tensile modulus of the fibers, as measured by an Instron tensile testing machine, is ordinarily at least about 300 grams/denier, preferably at least about 500 grams/denier, more preferably at least about 1,000 grams/denier and most preferably at least about 1,500 grams/denier. These highest values for tensile modulus and tenacity are generally obtainable only by employing solution spun or gel fiber processes. In addition, many ECPE fibers have melting points higher than the melting point of the polymer from which they are formed. Thus, for example, whereas ultra-high molecular weight polyethylenes of 500,000, one million and two million generally have melting points in the bulk of 138° C., the ECPE fibers made of these materials have melting points 7° to 13° higher. The increase in melting point reflect a higher crystalline orientation of the fibers as compared to the bulk polymer. Notwithstanding the contrary teachings in the prior art improved ballistic resistant articles are formed when polyethylene fibers having a weight average molecular weight of at least about 200,000 and preferably 500,000, a modulus of at least about 500 g/denier and a tenacity of at least about 15 grams/denier are employed. c.f. John V. E. Hansen and Roy C. Liable in "Flexible Body Armor Materials," Fiber Frontiers ACS Conference, June 10–12, 1974 (ballistically resistent high strength fibers must exhibit high melting point and high resistance to cutting or shearing); Roy C. Liable, Ballistic Materials and Penetration Mechanics, 1980 (noting that nylon and polyester may be limited in their ballistic effectiveness due to the lower melting point); and "The Application of High Modulus Fibers to Ballistic Protection", R. C. Liable, et al., J. Macromel, Sci. Chem., A7(1), pp. 295–322, 1973 (the importance of a high degree of heat resistance is again discussed).

In the case of polypropylene, highly oriented polypropylene fibers of weight average molecular weight at least about 300,000 and preferably 750,000, more preferably at least about one million and most preferably at least about two million may be used. Ultra high molecular weight polypropylene may be formed into reasonably highly oriented fibers by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is at least about 8 grams/denier, with a preferred tenacity being at least bout 11 grams/denier. The tensile modulus for polypropylene is at least about 160 grams/denier preferably at least about 200 grams/denier. The melting point of the polypropylene is generally raised several degrees by the orientation process, such that the polypropylene fiber preferably has a main melting point of at least about 168° C., more preferably at least about 170° C. Employing fibers having a weight average molecular weight of at least about 750,000 coupled with the preferred ranges for the above-described parameters (modulus and tenacity) can provide advantageously improved performance in the final article especially in ballistic resistant articles, nothwithstanding the contrary teachings in the prior art). c.f. Liable, Ballistic Materials and Penetration Mechanics, supra, at p. 81 (no successful treatment has been developed to bring the ballistic resistance of polypropylene up to levels predicted from the yarn stress-strain properties); and in NTIS publication ADA018 958, "New Materials in Construction for Improved Helmets", A. L. Alesi et al. [wherein a multilayer highly oriented polypropylene film material (without matrix), referred to as "XP", was evaluated against an aramid fiber (with a phenolic/polyvinyl butyral resin matrix); the aramid system was judged to have the most promising combination of superior performance and a minimum of problems of combat helmet development.

Aramid fiber is formed principally from the aromatic polyamide. Aromatic polyamide fibers having a modulus of at least about 400 grams/denier and tenacity of at least about 18 grams/denier are useful for incorporation into composites of this invention. For example, poly(phenylenediamine terphalamide) fibers produced commercially by Dupont Corporation under the trade name of Kevlar ® 29 and 49 and having moderately high moduli and tenacity values are particularly useful in forming ballistic resistant composites. (Kevlar ® 29 has 500 grams/denier and 22 grams/denier and Kevlar ® 49 has 1000 grams/denier and 22 grams/denier as values of modulus and tenacity, respectively).

Polyvinyl alcohol (PV-OH), fibers having a weight average molecular weight of at least about 200,000, preferably at least about 550,000, more preferably between about 1,000,000 and about 4,000,000 and most preferably between about 1,500,000 and about 2,500,000 may be employed in the present invention. Usable fibers should have a modulus of at least about 160 grams/denier, preferably at least about 200 grams/denier, more preferably at least about 300 grams/denier, and a tenacity of at least about 7 grams/denier, preferably at least about 10 grams/denier and most preferably at least 17 grams/denier. PV-OH fibers having a weight average molecular weight of at least about 500,000, a tenacity of at least about 200 grams/denier and a modulus of at least about 10 grams/denier are particularly useful in producing ballistic resistant composites. PV-OH fibers having such properties can be produced, for example, by the process disclosed in U.S. Pat. No. 4,599,267 to Kwon et al.

The fibers may be precoated with a polymeric material, preferably an elastomer based material prior to being arranged as described above. The low modulus elastomeric material has a tensile modulus, measured at about 23° C., of less than about 20,000 and preferably less than 6,000 psi (41,400 kPa). Preferably, the tensile modulus of the elastomer is less than about 5,000 psi (34,500 kPa), and most preferably is less than about 2,500 (17,250 kPa) to provide even more improved performance. The glass transition temperature (Tg) of the elastomer (as evidenced by a sudden drop in the ductility and elasticity of the material) should be less than about 0° C. Preferably, the Tg of the elastomer is less than about −40° C., and more preferably is less than about −50° C. The elastomer should have an elongation to break of at least about 50%. Preferably, the elongation to break is at least about 100%, and more preferably, it is about 300% for more superior performance.

A wide variety of elastomeric materials and formulations may be utilized in this invention. Representative examples of suitable elastomers have their structures, properties, and formulations together with crosslinking procedures summarized in the Encyclopedia of Polymer Science, Vol. 5, "Elastomers-Synthetic" (John Wiley & Sons Inc., 1964). The essential requirement is that the matrix materials of this invention have appropriately low moduli as noted above. For example, any of the following materials may be employed: polybutadiene, polyisoprene, natural rubber, ethylene-propylene copolymers, ethylenepropylene-diene terpolymers, polysulfide polymers, polyurethane elastomers, chlorosulfonated polyethylene, polychloroprene, plasticized polyvinylchloride using dioctyl phthalate or other plasticers well known in the art, butadiene acrylonitrile elastomers, poly(isobutylene-co-isoprene), polyacrylates, polyesters, polyethers, fluorelastomers silicone elastomers, thermoplastic elastomers, copolymers of ethylene.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type (AB)n(n=2-10) or radial configuration copolymers of the type R-(BA)x(x=30-150); wherein A is a block from a polyvinyl aromatic monomer and B is a block from a conjugated diene elastomer. Useful polymers are produced commercially by the Shell Chemical Co. and described in the bulletin "Kraton Thermoplastic Rubber", SC-68-81.

The low modulus elastomeric material may be compounded with fillers such as carbon black, silca, glass microballons, etc. up to an amount not to exceed about 300% by weight of elastomer, preferably not to exceed about 100% by weight and may be extended with oils and vulcanized by sulfur, peroxide, metal oxide or radiation cure systems using methods well known to rubber technologists of ordinary skill. Blends of different elastomeric materials may be used together or one or more elastomer materials may be blended with one or more thermoplastics. High density, low density, and linear low density polyethylene may be cross-linked to obtain a material of appropriate properties, either alone or as blends. The modulus of such a modified compound refers to the total matrix composition.

The proportion of coating on the coated fibers or fibrics may vary from relatively small amounts (e.g. 1% by weight of fibers) to relatively large amounts (e.g. 150% by weight of fibers), depending upon whether the coating material has impact or ballistic-resistant properties, and upon the rigidity, shape, heat resistance, wear resistance, flammability resistance and other properties desired for the composite article. In general, ballistic-resistant articles of the present invention containing coated fibers should have a relatively minor proportion of coating since the ballistic-resistant properties are almost entirely attributable to the fiber. Nevertheless, coated fibers with higher coating contents may be employed. Useful amounts of coating, based upon the weight of the fiber range from 5 to 100, preferably 10 to 50, and most preferably 10 to 30 percent.

The coating may be applied to the fiber in a variety of ways. One method is to apply the resin of the coating material to the stretched high modulus fibers either as a liquid, a sticky solid or particles in suspension, or as a fluidized bed. Alternatively, the coating may be applied as a solution or emulsion in a suitable solvent which does not adversely affect the properties of the fiber at the temperature of application. While any liquid capable of dissolving or dispersing the coating polymer may be used, preferred groups of solvents include water, paraffin oils, ketones, alcohols, aromatic solvents or hydrocarbon solvents or mixtures thereof, with illustrative specific solvents including paraffin oil, xylene, toluene and octane. The techniques used to dissolve or disperse the coating polymers in the solvents will be those conventionally used for the coating of similar elastomeric materials on a variety of substrates.

Other techniques for applying the coating to the fibers may be used, including coating of the high modulus precursor before the high temperature stretching operation, either before or after removal of the solvent from the fiber. The fiber may then be stretched at elevated temperatures to produce the coated fibers. The extruded gel fiber may be passed through a solution of the appropriate coating polymer (solvent may be paraffin oil, aromatic or aliphatic solvent) under conditions to attain the desired coating. Crystallization of the high molecular weight polyethylene in the gel fiber may or may not have taken place before the fiber passes into the cooling solution. Alternatively, the fiber may be extruded into a fluidized bed of the appropriate polymeric powder.

The fiber used in the present invention, as indicated above can be monofilament fiber, multifilament fiber, ribbons, strip or combinations thereof. The fiber can have regular or irregular cross-section. The fiber can be in the form of a monofilament or multifilament yarn. It can be twisted or untwisted.

Figure 4:
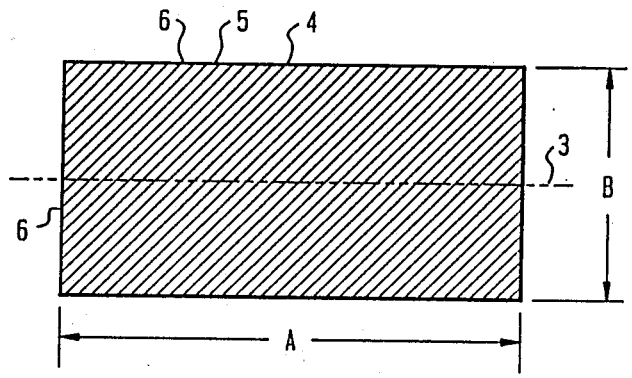
FIG. 4 is an alternate embodiment of the present invention showing a fibrous element useful in making the prepreg layer.

The fibers in the fibrous elements used to form the prepreg layers of the present invention are preferably arranged unidirectionally in that each fiber is parallel to an adjacent fiber. The fibers are at an oblique angle to the longitudinal axis of the elements. A preferred angle is in the range of 30° to 60° and more preferably 40° to 50°, with about 45° most preferred. The fibrous web is impregnated with a polymeric material to form the prepreg layer. The prepreg layer is cut so that the longest continuous fiber in the layer is from up to eight inches, preferably 1 to 8 inches, and more preferably 2 to 6 inches and most preferably 2 to 4 inches in length. Typical embodiments of the cut prepreg layer useful in the present invention are shown in FIGS. 1 and 4. FIG. 1 illustrates a long strip element 5 in which the continuous fibers 2 are at a oblique angle to the longitudinal axis 3 of the strip 6. FIG. 4 illustrates a short element which can be square or rectangular having continuous fibers 4 perpendicular to one edge 5 of the element which is parallel to the longitudinal axis. While these are preferred elements, it is recognized that any shape element containing unidirectionally fibers of from 1 to 8, and preferably 2 to 6 inches can be used.

The prepreg layer of the present invention is made of at least two adjacent coplanar fibrous elements of the type shown in FIGS. 1 and 4. The impregnated fiber elements are laid up and connected at their boundaries. Preferably they are butted together and result in the coplanar prepreg layer of the present invention. The elements are connected through the polymer matrix.

Figure 2:
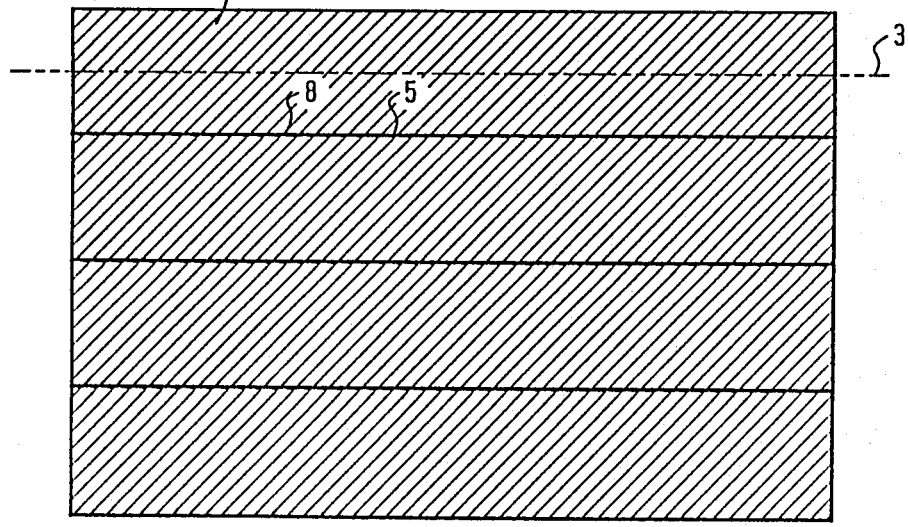
FIG. 2 is a prepreg layer made of the coplanar fibrous element.

FIG. 2 shows a useful prepreg layer 10 of the present invention. It is made of an array of coplanar strip elements 7. These are spliced together to form a boundary 8 along longitudinal edges 5 which are parallel to longitudinal axis 3.

A preferred composite of the present invention is strip prepreg 6 shown in FIG. 1. This strip prepreg 6 is comprised of at least two strip elements 5. Each strip element is shown with one element in the coplanar array but more than one can be used. Additional elements can be spliced or added along the longitudinal edges or along the transverse edges. The strip element 6 has a longitudinal axis 3. The fibers 2 in the strip elements 6 are unidirectional and embedded as a polymeric matrix. The fibers 2 in each strip element 5 are at an oblique angle $\phi$, to the longitudinal axis. The fibers are from one to eight inches long. The fibers in adjacent layers are at an angle $\theta$ from each other. In the preferred embodiment $\theta$ is about 90° and $\phi$ and $\phi'$ are at about 45°.

Figure 3:
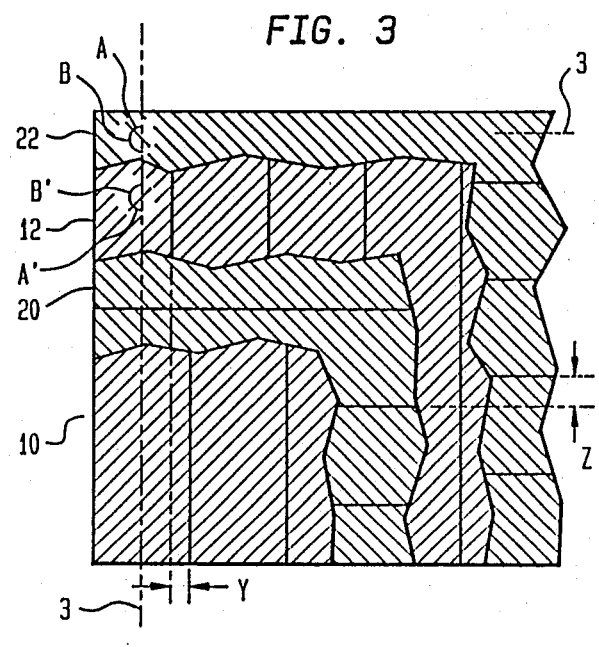
FIG. 3 is a top view of four layers of a multilayer composite of the present invention showing the position of the strip elements as presented in FIG. 1.
Figure 5:
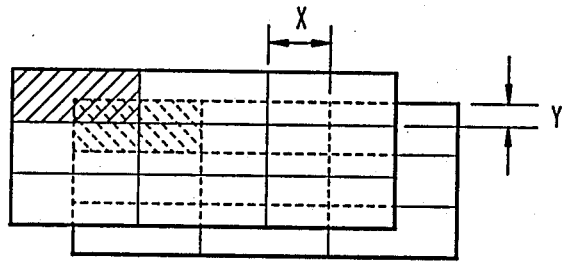
FIG. 5 is a top view of a two layer composite built using the element shown in FIG. 4.

FIGS. 3 and 5 show preferred embodiments of the multilayer composite using the prepreg layers of the present invention. The prepreg layers made using the elements such as shown in FIGS. 2 and 4 are used to make multilayer composites. Each prepreg layer comprises an array of at least two adjacent coplanar fibrous elements. The fibers of adjacent layers are at an angle of from 45° to 90°, preferably 60° to 90°, more preferably 80° to 90°, and most preferably at an angle of about 90° from the fiber and the adjacent layers. The element boundaries of adjacent layers are offset from each other as shown by Z and Y in FIGS. 3 and 5 This prevents weakness should an impact occur at the boundary of a given layer. The orientation of the fibers of an element within a prepreg layer can vary from element to element as shown in FIG. 5. For example, the fibers in one element can be 90° different from the fibers in an adjacent element within a prepreg layer. When this is the case adjacent layers could have portions of each of given elements having a common angle. It is preferred that a significant part of adjacent elements in the adjacent layers have fibers at angles of about 90° from each other.

Figure 6:
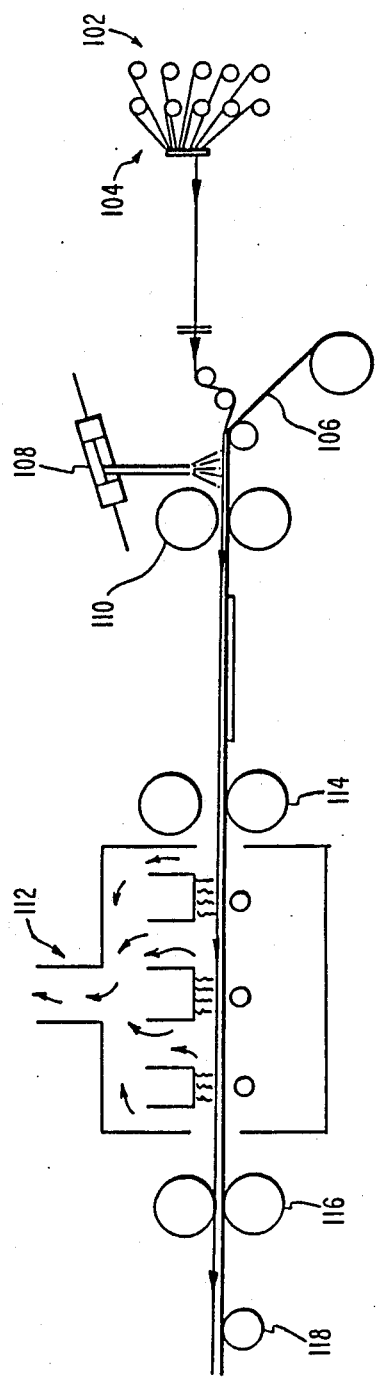
FIG. 6 is a schematic drawing of a layout used to make elements for prepregs of the present invention.

FIG. 6 illustrates a schematic view of a process to make the layers useful for elements to make prepreg layers of the present invention. This typical process illustrates forming the prepreg from multifilament yarn and impregnating these fibers with matrix resin. The process generally comprises the steps of bringing the yarn in sheet form onto a carrier web and bringing the yarn laid in the unidirectional sheet form into contact with the matrix resin. The matrix resin can be in the form of solution, emulsion or melt. The next step is to consolidate the resin impregnated sheet. This can be accomplished by drying to remove the solvent or cooling to solidify the melt. The prepreg sheet is then rewound and cut for use in accordance with the present invention.

A useful process is illustrated in FIG. 6. A plurality of yarn is supplied from a creels 102 and passed through a combing stations 104. The combed yarn is then placed on a carrier web which can be a paper or film substrate 106. A polymer resin is applied to the yarn layer at 108. The coated yarn is then passed through a pair of rollers 110. The rollers spread the resin uniformly among the filaments of yarn. The impregnated yarn layer is then passed through a heated oven 112 for drying. Nip rollers 114 is used to control final layer thickness. Nip roller 116 is used to pull the carrier web and prepreg through the system. The substrate and the prepreg are wound on roller 118. The prepreg sheet can then be cut into suitable elements to make the prepreg layers of the present invention.

Suitable matrix materials include polyethylenes, cross-linked polyethylenes, polypropylenes, ethylene copolymers, propylene copolymers and other olefin polymers and copolymers. Examples of such other matrix materials include unsaturated polyesters, phenolics, polybutyrals, epoxy resins and polyurethane resins and other low modulus resins curable below the melting point of the fiber.

The proportion of matrix to fiber is variable for the composites, with matrix material amounts of from about 5% to about 150%, by weight of fibers, representing the broad general range. Within this range, it is preferred to use composites having a relatively high fiber content, such as composites having only 10-50% matrix material, by weight of fibers, and more preferably 10-30% matrix material.

Stated another way, the fiber network occupies different proportions of the total volume of the composite. preferably, however, the fiber network comprises at least about 30 volume percent of the composite. For ballistic protection, the fiber network comprises at least about 50 volume percent, and most preferably at least about 70 volume percent, with the matrix occupying the remaining volume.

Composites made using the prepreg layer are made using the above-described fibrous elements. A preferred way to make the prepregs is to lay-up individual layers and heat them and form them into the desired configuration. Suitable means include compression molding, stamping, or heating under pressure within an autoclave.

One technique for forming a composite includes the steps of arranging prepeg sheet into a desired element structure. The prepreg layers are then made into a composite by laying up the prepeg layers. The composite is then heated under pressure to cause the matrix material to flow and occupy any void spaces. In the above cases, it is possible that the matrix can be caused to stick or flow without completely melting. In general, if the matrix material is caused to melt, relatively little pressure is required to form the composite; while if the matrix material is only heated to a sticking point, generally more pressure is required. Also, the pressure and time to set the composite and to achieve optimal properties will generally depend on the nature of the matrix material (chemical composition as well as molecular weight) and processing temperature.

The applicants have found that the construction of the prepreg layer of the present invention results in a layer having unidirectional short fibers of from 1 to 8 and preferably 2 to 6 inches in length. When these fibers are used to form a multilayer composite of at least 2, and preferably from 2 to about 500, and more preferably 60 to 120 layers they have unexpectedly improved ballistic impact resistance. An advantage has been found where the boundaries of the elements within each layer are offset from each other so as to not to have a flaw or weak point through at least two layers.

The prepreg layers of the present invention typically contain from 5 to 30 fiber ends per inch and preferably 10 to 20 per inch. Each layer is typically from 0.0001 to 0.015, preferably 0.0005 to 0.01, more preferably 0.0005 to 0.005 and most preferably 0.0005 to 0.0025 inches thick. Layers having these dimensions are particularly useful when made of extended chain polyethylene yarn having a yarn denier of about 1200 denier/118 filaments. The areal density is used to indicate the amount of fiber and/or resin per unit area of the prepreg layer. It is determined by the number of yarn strands laid per unit width of prepreg sheet and the amount of resin applied to the yarn. Typically if a 1200 denier/118 filament yarn is laid by 15 ends per inch the yarn areal density in the prepreg sheet would be about 79 grams per square meter.

In an alternate embodiment the present invention the prepreg elements can be made of knit or woven fabric embedded in a polymer matrix. Prepreg layers can be made of at least one coplanar prepreg element. The woven fabric is woven so that the filling and warp fibers are at an angle of from 45° to 90° from each other. The prepreg layers can be formed into the composite of the current invention. The fibers are from up to eight inches, preferably one to eight inches and more preferably two to eight inches long. The weave can vary as desired but is typically at 10 to 40 preferably to to 20 ends per inch for 1200 denier extended chain polyethylene. The present invention includes a multilayer composite comprising a plurality of prepreg layers where each prepreg layer comprises an array of at least two adjacent coplanar fibrous elements. Each element comprises a plurality of knit or woven fibers embedded in a polymeric matrix in an analagous way as the unidirectional fiber prepreg layers recited above. The fibers in the filling and warp direction of adjacent layers are respectively parallel. The fibers are at an oblique angle to the longitudinal axis of each element.

The composites made can be molded in flat or three dimensional presses, stamped or molded in an autoclave. The main variables are pressure, time and temperature. Flat plaques can be molded between two plates of a molding press. The plates are heated to a control temperature. A molding press which has been used has a plate size of 2 feet by 2 feet and a molding pressure of up to 200 tons.

The following examples are presented to provide a more complete understanding of the invention, the specific techniques, conditions, materials, proportions and reported data set forth to illustrate the principles of the invention are exemplary and should not be construed as to limiting the scope of the invention.

EXAMPLES

Figure 7:
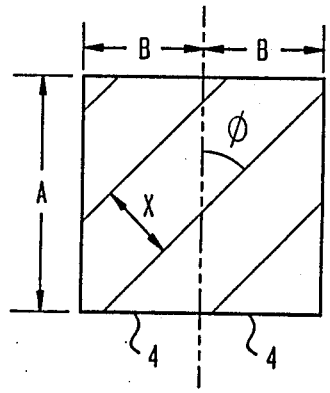
FIG. 7 is a schematic drawing of a prepreg layer of the type used in the Examples.

The following examples are of multilayer composites made of plaques of 8 by 8 inches as indicated. The plaques were prepared by forming prepreg layers using fibrous elements of the type shown in FIG. 7. Additional layers were laid-up alternatingly with fiber direction in alternate layers perpendicular. Strips with length "X" as shown in FIG. 7 of 2 inches were cut from the 8 by 8 inch plaques. Each multilayered composite contained 32 layers and was about 0.12 inches (0.30 cm) thick. The fiber was at a 45° angle to the longitudinal axis or edge of the square plaque. The fiber in adjacent layers were perpendicular to each other in that the angle $\theta$ is about 90°. Comparative plaques were made. In Comparative 1 the plaque was made using an 8 by 8 inch element. In Comparative 2 the plaque was made using a strip 2 inches wide wherein the fiber orientation in alternate layers was perpendicular to the longitudinal axis in that $\phi$ is equal to 90°, and the fiber in adjacent layers was at $\theta$ of about 90°.

The ballistic composites were tested using a 0.22 caliber, non-deforming steel fragment of specified weight, hardness and dimensions (MIL-SPEC. MIL-P-46593 A (ORD)). The protective power of a structure is normally expressed by citing the impacting velocity at which 50% of the projectiles are stopped, and is designated the $V_{50}$ value. The areal density corresponds to the weight per unit area of a structure. In the case of a fiber reinforced composites, the ballistic resistance depends mostly on the fiber. A useful weight characteristic is fiber areal density of composites. This term corresponds to the weight of the fiber reinforcement per unit area of the composite.

To compare structures having different $V_{50}$ values and different areal densities, the examples present the ratios of (a) the kinetic energy (Joules) of the projectile at the $V_{50}$ velocity, to (b) the areal density of the fiber or of the composite (kilograms per meter square). These ratios are designated as the Specific Energy Absorption based on the fiber areal density (SEA) and specific energy absorption of composite (SEAC), respectively.

Example 1 and the Comparatives 1 and 2 were made using 8×8 inch plaques. In these examples the fiber used was Spectra ® 900 extended chain polyetheylene fiber produced by Allied Corporation. This fiber is yarn which is reported to have a tenacity of approximately 29.5 grams/denier, a modulus of approximately 1250 grams/denier, an energy to break of approximately 55 joules/gram, a yarn denier of approximately 1200 and an individual filament denier of approximately 10 (118 filaments, untwisted yarn). The prepregs were made using yarn which was made at approximately 10 ends per inch. The yarn was pulled from creeles and coated with the indicated polymer. The polymers used were Kraton D-1107, a styrene-isoprene-styrene block copolymer (SIS). This material is sold by the Shell Chemical Co. and is described in the bulletin Kraton Thermoplastic Rubber, Typical Property Guide Kraton D and Kraton G. It is indicated to have the number SC:68–81. The specific Kraton D resin used was Kraton D-1107, which has a glass transition temperature of −58° C. The composite of Example 1 had 32 prepreg layers. Comparatives 3 and 4 were made using Kevlar fabric. Comparative 3 had 10 fabric layers and Comparative 4 had 22 fabric layers. The polyaramid fiber in Comparative 3 and 4 was Kevlar ® 29 ballistic fabric, Clark-Schwebb Fiber Glass Corp. Style 713, plain weave, 31×31 ends per inch of untwisted 1000 denier fabric. Example 2 was similar to Example 1 but containing 64 prepreg layers. Example 2 consisted of 2 plaques from Example 1. Table 1 summarizes the construction and ballistic impact results for various plaques evaluated.

TABLE 1

| Example | Fiber length inch | ∅/∅' (°) | Fiber AD kg/m² | Composite ADT kg/m² | V50 ft/sec | SEA Jm²/kg | SEAC Jm²/kg |
| --- | --- | --- | --- | --- | --- | --- | --- |
| Ex. 1 | 2.8 × 2.8 | 45/45 | 1.93 | 2.72 | 1454 | 56.1 | 40.2 |
| Comp 1 | 8 × 8 | 0/90 | 1.93 | 2.72 | 1292 | 44.3 | 31.9 |
| Comp 2 | 2 × 8 | 0/90 | 1.93 | 2.72 | 1327 | 46.7 | 33.1 |
| Comp 3 | 17 × 17 | 0/90 | 2.82 | 2.82 | 1332 | 32.2 | 32.2 |
| Comp 4 | 17 × 17 | 0/90 | 6.2 | 6.2 | 1850 | 28.3 | 28.3 |
| Ex. 2 | 2.8 × 2.8 | 45/45 | 3.86 | 5.44 | 1880 | 46.9 | 33.3 |

The plaque flexibility was measured under its own weight. The plaques from Example 1 and Comparative 2 were 2 inches wide (5.08 cm) supported at one end with an 18 cm length unsupported. The measurement of the deflection of the plaques under their own weight was made. The end of the plaque from Example 1 bent down about 4 cm while that from Comparative 2 bent 0.3 cm.

A review of the above results indicates that the composite laminates of the present invention have improved ballistic resistant properties and are more flexible than corresponding plaques having longer fibers and/or having fibers that are not at the angle required by the present invention.

While examplary emodiments of the invention have been described, the true scope of the invention is to be determined from the following claims.

We claim:

1. A multilayer composite comprising a plurality of prepreg layers where each prepreg layer comprises an array of at least two coplanar fibrous elements, with each element having a longitudinal axis and comprising a plurality of unidirectional fibers embedded in a polymeric matrix, the fibers being at an angle of from 30° to 60° to the longitudinal axis of the element and up to eight inches in length.

2. The composite as recited in claim 1 wherein the fibers of the prepreg layers are from about one to about eight inches long.

3. The composite as recited in claim 2 wherein the fibers of the prepreg layers are from about two to about six inches long.

4. The composite as recited in claim 1 wherein the fibers of adjacent layers are at an angle of from about 45° to 90° from each other.

5. The composite as recited in claim 4 wherein the fibers of adjacent layers are at an angle of from 80° to 90° from each other.

6. The composite as recited in claim 1 wherein the adjacent elements are connected along element boundaries by the polymer matrix and the element boundaries of alternate layers being offset from each other.

7. The composite as recited in claim 1 wherein the fibers of the prepreg layers have a tensile modulus of at least about 160 g/denier and an energy to break of at least 7 J/g.

8. The composite as recited in claim 1 wherein there are from 2 to 500 prepreg layers.

9. The composite as recited in claim 8 wherein there are from 60 to 120 layers.

10. The composite as recited in claim 1 in the shape of a strip.

11. A multilayer composite consisting essentially of a plurality of prepreg layers where each prepreg layer consists essentially of an array of at least two coplanar fibrous elements, with each element having a longitudinal axis and comprising a plurality of unidirectional fibers embedded in a polymeric matrix, the fibers being at an angle of from 30° to 60° to the longitudinal axis of the element and up to eight inches in length.

12. A multilayer composite comprising a plurality of prepreg layers where each prepreg layer comprises a fibrous element having a longitudinal axis and comprising a plurality of unidirectional fibers embedded in a polymeric matrix, the fibers being at an angle of from 30° to 60° to the longitudinal axis of the element and up to eight inches in length.

13. The composite as recited in claim 12 wherein the fibers of the prepreg layers are from about one to about eight inches long.

14. The composite as recited in claim 12 wherein the fibers of adjacent layers are at an angle of from about 45° to 90° from each other.

* * * * *